United States Patent
Wicht et al.

(10) Patent No.: US 8,234,084 B2
(45) Date of Patent: Jul. 31, 2012

(54) APPARATUS AND METHOD FOR AUTOMATIC GAUGE READING IN AN INVENTORY CONTROL AND MANAGEMENT SYSTEM

(75) Inventors: Fernand Wicht, Fribourg (CH); Bin Sai, Zuid Holland (NL)

(73) Assignee: Enraf B.V., Delft (NL)

( * ) Notice: Subject to any disclaimer, the term of this patent is extended or adjusted under 35 U.S.C. 154(b) by 402 days.

(21) Appl. No.: 12/405,946

(22) Filed: Mar. 17, 2009

(65) Prior Publication Data
US 2010/0241369 A1 Sep. 23, 2010

(51) Int. Cl.
G01F 23/00 (2006.01)
G06F 17/40 (2006.01)

(52) U.S. Cl. ............ 702/55; 702/50; 702/100; 73/290 R (58) Field of Classification Search ............... 702/55, 702/50, 100
See application file for complete search history.

(56) References Cited

U.S. PATENT DOCUMENTS

| | | |
|---|---|---|
| 5,027,526 A | 7/1991 | Crane |
| 5,406,842 A | 4/1995 | Locke |
| 5,442,359 A | 8/1995 | Rubin |
| 5,708,424 A * | 1/1998 | Orlando et al. .......... 340/870.08 |
| 5,773,913 A * | 6/1998 | Casselden .................. 310/338 |
| 5,774,089 A | 6/1998 | Bamler et al. |
| 6,374,187 B1 * | 4/2002 | Knight et al. .................. 702/51 |
| 6,629,458 B1 | 10/2003 | Westerling et al. |
| 6,662,649 B1 * | 12/2003 | Knight et al. .............. 73/290 V |
| 2003/0167839 A1 | 9/2003 | Burger et al. |
| 2004/0196177 A1 | 10/2004 | Billington et al. |
| 2005/0190098 A1 | 9/2005 | Bridgelall et al. |

FOREIGN PATENT DOCUMENTS

| | | |
|---|---|---|
| DE | 296 08 551 U1 | 7/1996 |
| DE | 100 40 180 A1 | 4/2002 |
| DE | 10 2005 019 095 A1 | 10/2006 |
| WO | WO 98/12514 A1 | 3/1998 |
| WO | WO 2004/053521 A1 | 6/2004 |
| WO | WO 2007/053007 A1 | 5/2007 |
| WO | WO 2007/111498 A2 | 10/2007 |
| WO | WO 2008/010702 A1 | 1/2008 |
| WO | WO 2008/104967 A2 | 9/2008 |
| WO | WO 2010/019427 A2 | 2/2010 |

OTHER PUBLICATIONS

European Search Report dated Aug. 17, 2010 in connection with European Patent Application No. EP 10 15 5559.

(Continued)

*Primary Examiner* — Hal Wachsman (57) ABSTRACT

A system includes a probe configured to be raised and lowered in a tank that is configured to receive a material. The system also includes a connector coupled to the probe and having at least one type of coding encoded on the connector. The system further includes a main unit configured to raise and lower the probe using the connector, digitally capture information associated with the at least one type of coding on the connector, determine a level reading identifying a level of the material in the tank using the captured information, and wirelessly transmit the determined level reading.

24 Claims, 4 Drawing Sheets

OTHER PUBLICATIONS

International Standard, Petroleum and liquid petroleum products—Measurement of level and temperature in storage tanks by automatic methods, Part 3: Measurement of level in pressurized storage tanks (non-refrigerated), 1st Edition, Nov. 15, 2002, 21 pages.

"Level sensor", wikipedia.org, Aug. 2, 2008, 8 pages.

Bin Sai, "Method and Apparatus for Real-Time Calibration of a Liquid Storage Tank Level Gauge", U.S. Appl. No. 12/119,957, filed May 13, 2008.

Fernand Wicht, et al., "Apparatus and Method for Monitoring Tanks in an Inventory Management System", U.S. Appl. No. 12/467,012, filed May 15, 2009.

"HERMetic Sensor", Honeywell Enraf, (no month) 2007, 5 pages.

"Servo Gauge 854ATG" Product Sheet, Enraf B.V., May 2008, 4 pages.

"Starrett Digitape 25", 1999, 4 pages.

* cited by examiner

APPARATUS AND METHOD FOR AUTOMATIC GAUGE READING IN AN INVENTORY CONTROL AND MANAGEMENT SYSTEM

TECHNICAL FIELD

This disclosure relates generally to inventory control and management systems and more specifically to an apparatus and method for automatic gauge reading in an inventory control and management system.

BACKGROUND

Processing facilities and other facilities routinely include tanks for storing liquid materials and other materials. For example, storage tanks are routinely used in tank farms and other storage facilities to store oil or other materials. As another example, oil tankers and other liquid transport vessels routinely include numerous tanks storing oil or other materials.

Various measurements often need to be taken of materials in tanks. For example, the material level in a loaded tank often must be measured very accurately to determine the total quantity of materials in the tank. For inventory control involving oil storage, for instance, it is common practice to obtain at least three accurate measurements: product level (ullage), product temperature, and bottom water level.

As another example, customers typically like to make maximum use of storage capacity when loading a tanker, meaning onboard tanks are filled to their highest points. Accurate tank measurements are also often important for onboard operational safety and stability.

Measurements related to these and other applications or operations are often performed using portable gauges. The portable gauges typically release a connecting structure (such as a graduated, magnetic-coded, or perforated tape) into a tank to measure the distance to materials (product) in the tank. The use of portable gauges often requires intense concentration by operators or other personnel. This often makes it difficult for the personnel to obtain accurate readings, especially when the material level is continuously changing, which can result in inadequate data collection.

SUMMARY

This disclosure provides an apparatus and method for automatic gauge reading in an inventory control and management system.

In a first embodiment, a method includes raising or lowering a probe in a tank that is configured to receive a material. The probe is coupled to a connector, and the connector includes at least one type of coding encoded on the connector. The method also includes digitally capturing information associated with the at least one type of coding on the connector. The method further includes determining a level reading identifying a level of the material in the tank using the captured information. In addition, the method includes wirelessly transmitting the determined level reading.

In particular embodiments, the connector includes a tape, and the at least one type of coding includes visible markings, perforations, and/or magnetic codes.

In a second embodiment, a system includes a probe configured to be raised and lowered in a tank that is configured to receive a material. The system also includes a connector coupled to the probe and having at least one type of coding encoded on the connector. The system further includes a main unit configured to raise and lower the probe using the connector, digitally capture information associated with the at least one type of coding on the connector, determine a level reading identifying a level of the material in the tank using the captured information, and wirelessly transmit the determined level reading.

In a third embodiment, an apparatus includes a sensor configured to digitally capture information associated with at least one type of coding encoded on a connector. The connector is configured to raise and lower a probe in a tank capable of receiving a material. The apparatus also includes a processor configured to determine a level reading identifying a level of the material in the tank using the captured information. The apparatus further includes a wireless interface configured to wirelessly transmit the identified level reading.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
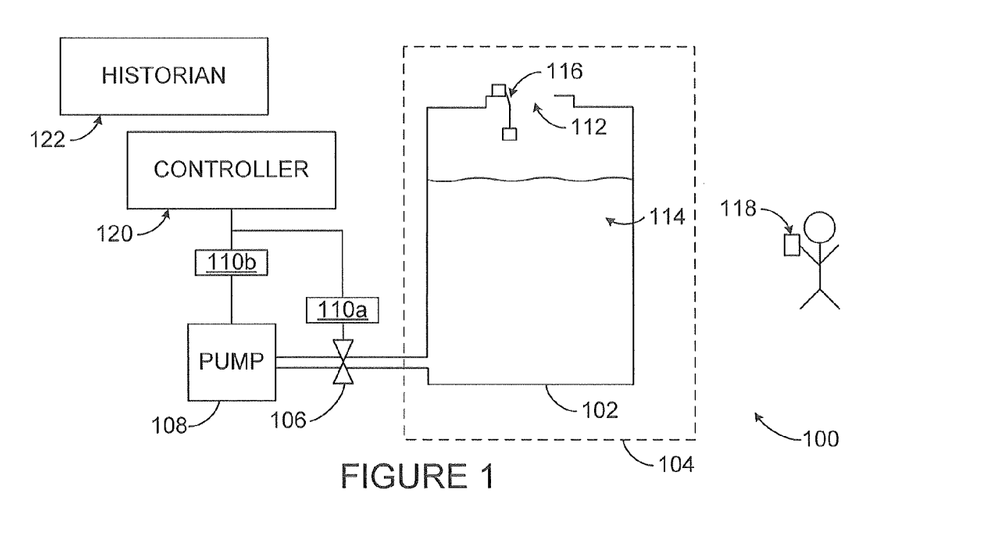
FIG. 1 illustrates an example inventory control and management system according to this disclosure.

FIG. 1 illustrates an example inventory control and management system 100 according to this disclosure. As shown in FIG. 1, the inventory control and management system 100 includes at least one tank 102. The tank 102 generally represents any suitable structure for receiving and storing at least one liquid or other material. The tank 102 could, for example, represent an oil storage tank. The tank 102 could have any suitable shape and size, and the tank 102 could form part of a larger structure 104. The larger structure 104 could represent any fixed or movable structure containing or associated with one or more tanks 102, such as a movable tanker vessel, railcar, or truck or a fixed tank farm.

In this example, at least one valve 106 controls the flow of material into or out of the tank 102. Also, a pump 108 is used to pump material into or out of the tank 102 through the valve 106. The valve 106 may be associated with a valve actuator 110a, which can open and close the valve 106 to adjust the flow of material into or out of the tank 102. Similarly, the pump 108 may be associated with a pump actuator 110b, which can control the operation of the pump 108 to adjust the flow of material into or out of the tank 102. While the valve 106 and pump 108 are shown here as filling the tank 102 from the bottom, the tank 102 can be filled in any suitable manner and in any suitable location. Moreover, the valve 106 and pump 108 can be used in conjunction with one or multiple tanks 102. For example, if used to fill multiple tanks 102, the valve 106 and pump 108 can be selectively coupled to one or more of the tanks 102 being filled, and once filled the valve 106 and pump 108 can be decoupled from those tanks and coupled to one or more other tanks 102.

As shown in FIG. 1, the tank 102 includes an opening 112 along its top or upper surface. The opening 112 could represent any suitable opening or other structure providing access to the interior of the tank 102. The opening 112 could also represent a structure that can be selectively opened and closed to provide temporary access to the tank 102. As particular examples, the opening 112 could represent a hatch or a valve.

In this example embodiment, the height or level of one or more materials 114 in the tank 102 can be monitored by a tank monitoring system 116. The tank monitoring system 116 represents a device or system that can measure the level of material 114 in the tank 102 with high accuracy. The tank monitoring system 116 could, for example, continuously and automatically measure the level of material 114 in the tank 102 during a topping-off procedure with millimeter accuracy. In this way, the tank monitoring system 116 can constantly monitor the level of material 114 in the tank 102, such as over the last few meters close to the final maximum filling level of the tank 102. Note here that the term "level" could refer to the absolute level of the material 114 in the tank 102, such as when the level represents the distance between the top of the material 114 and the bottom of the tank 102 (and the total height of the tank 102 is known). The term "level" could also refer to the relative level of the material 114 in the tank 102, such as when the level represents the distance between the top of the material 114 and the top of the tank 102.

The level measurements generated by the tank monitoring system 116 could be used in any suitable manner. For example, the level measurements could be provided to a human operator, such as via a display on the tank monitoring system 116 or a portable or other user device 118 (like a mobile telephone, personal digital assistant, or other device) used by the operator. The human operator could use these measurements in any suitable manner, such as to monitor the material level and control the flow of material 114 into the tank 102. The level measurements could also be provided to a controller 120, which could control the value 106 or pump 108 via the actuator 110a or 110b to control the flow of material 114 into the tank 102. The level measurements could further be provided to a historian 122, which could record the measurements for historical or other purposes. In addition, the tank monitoring system 116 could use the measurements, such as by displaying the measurements or sounding an alarm (or triggering other visual or audio indicators) to warn the operator that the material level in the tank 102 has reached one or more specified levels.

As a particular example, during loading of tanks 102 on a vessel, a topping off procedure generally involves loading the material 114 into the tanks 102 at a slower rate when the tanks 102 are "almost full." During this procedure, any number of tanks (such as two, four, or six) could be loaded at the same time, and the topping off procedure generally involves personnel both on the vessel and on shore performing certain functions. Measurements from the tank monitoring system 116 could be provided to any of these personnel to support the successful completion of the topping off procedure.

The measurements from the tank monitoring system 116 may be more accurate than conventional level sensors. For example, with the tank monitoring system 116, accurate measurements of the level of material 114 in the tank 102 can be captured automatically. Also, as described in more detail below, various techniques can be implemented when the tank monitoring system 116 is used in environments where contamination can interfere with the operation of conventional gauges. For instance, crude oil or other materials may remain on an encoded connector structure (such as a tape) that is used to measure the level of material in the tank 102. Also, the connector structure itself, a coating on the connector structure, or the encoded information could become damaged during use. The tank monitoring system 116 can perform various functions to estimate the proper level of material in the tank 102 despite these or other problems. Moreover, the tank monitoring system 116 can determine a confidence level or interval associated with each level reading. The confidence level or interval defines how certain the tank monitoring system 116 is that a level reading is correct. This may be useful in situations where human operators may have difficulty visually confirming (or may not be able to confirm) a level reading, such as in an environment where hazardous materials are being loaded.

In some embodiments, the tank monitoring system 116 represents a portable device or system that can be moved from one tank 102 to another tank 102 by an operator or other personnel. Also, in some embodiments, the tank monitoring system 116 can be used to support topping-off, monitoring, and measuring functionalities, such as temperature, material and water interface, and water level detection. In addition, the tank monitoring system 116 could integrate one or more measurement techniques along with auto-calibration, power management, and wireless communications. This may allow the tank monitoring system 116 to achieve high precision, low power consumption, and real-time monitoring and dispatching under intrinsically safe provisions.

The tank monitoring system 116 includes any suitable structure(s) for determining the level of material in a tank. Details of example embodiments of the tank monitoring system 116 are shown in FIGS. 2 through 5, which are described below.

Although FIG. 1 illustrates one example of an inventory control and management system 100, various changes may be made to FIG. 1. For example, a system could include any number of tanks, valves, pumps, tank monitoring systems, actuators, controllers, historians, and user devices. Also, the makeup and arrangement of the inventory control and management system 100 are for illustration only. Components could be added, omitted, combined, subdivided, or placed in any other suitable configuration according to particular needs. In addition, FIG. 1 illustrates one operational environment in which tank monitoring functionality can be used. This functionality could be used in any other suitable system.

Figure 2:
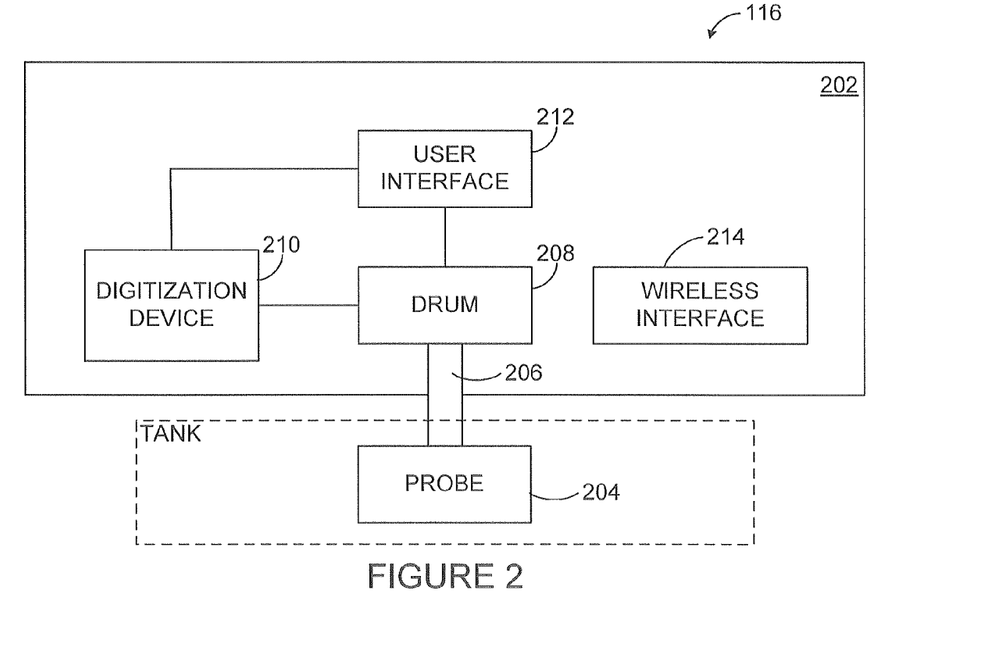
FIG. 2 illustrates an example tank monitoring system according to this disclosure.

FIG. 2 illustrates an example tank monitoring system 116 according to this disclosure. As shown in FIG. 2, the tank monitoring system 116 includes a main unit 202, a probe 204, and a connector structure 206. In general, the main unit 202 can be placed at or near the opening 112 of a tank 102, and the main unit 202 can raise and lower the probe 204 within the tank 102 using the connector structure 206. The main unit 202 can also generate level readings identifying the level of material 114 in the tank 102. For example, the main unit 202 can measure the amount of connector structure 206 needed to lower the probe 204 into an appropriate position (such as in contact with the material 114 in the tank 102). Servo and manual dip measurements are often "contact" measurements, meaning measurement devices typically require physical contact with the material being measured. Other measurement techniques could also be used, such as a modified servo measurement technique where an amount of dispensed connector structure (the distance between the main unit 202 and the probe 204) is added to an ultrasonic or other measurement (the distance between the probe 204 and the material 114).

The probe 204 is raised and lowered in a tank 102 and can perform sensing or measurement operations. For example, in servo and manual dip measurements, the probe 204 can sense when it contacts a certain material in the tank 102. In modified servo measurements, the probe 204 can measure the distance between itself and a material in the tank 102, such as by using ultrasonic measurements. The probe 204 could also capture other measurements associated with the material in the tank 102, such as the temperature of the material. Communications with the main unit 202 could occur via a wired communication link in the connector structure 206.

The connector structure 206 represents any suitable connector coupling the main unit 202 and the probe 204. The connector structure 206 could include power supply lines for providing power to the probe 204 from the main unit 202 and communication lines for enabling communications between the probe 204 and the main unit 202. The connector structure 206 also includes distance information printed or otherwise encoded onto the connector structure itself, such as visible markings identifying feet, yards, or meters (and subdivisions thereof). The markings or other types of coding can be read by the main unit 202 to measure the amount of connector structure 206 dispensed, which allows the main unit 202 to identify the distance between itself and the probe 204. The markings or other types of coding could also allow an operator to visually determine the amount of connector structure 206 that has been dispensed. The connector structure 206 includes any suitable structure facilitating the raising and lowering of a probe and that includes at least one type of coding for identifying a distance. The connector structure 206 could have any suitable size and shape (such as narrower wire form or broader tape form) and can be formed from one or more suitable materials (such as plastic or metal). Also, the at least one type of coding on the connector structure 206 could include visible markings, perforations, and/or magnetic codes.

In this example, the main unit 202 includes a drum 208. The connector structure 206 can be wrapped or wound around the drum 208, and the drum 208 can be rotated to raise and lower the probe 204. For example, the drum 208 could be rotated in one direction to lower the probe 204 and rotated in the other direction to raise the probe 204. The drum 208 includes any suitable structure for raising and lowering a probe by dispensing and collecting a connector structure, such as a cylindrical-shaped object.

Figure 3:
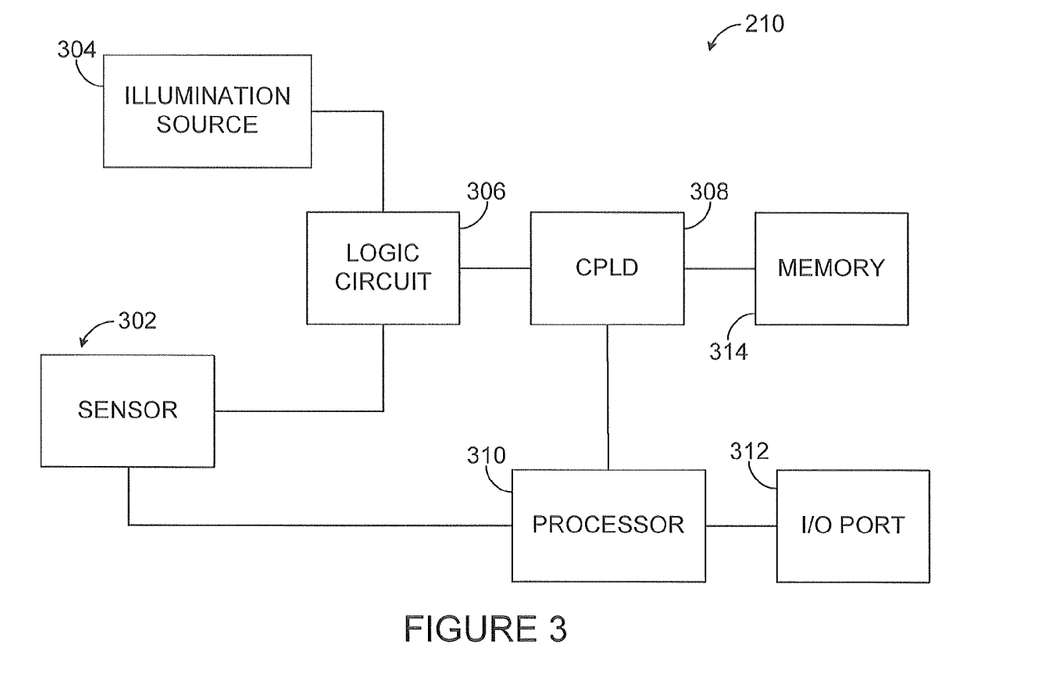
FIG. 3 illustrates an example digitization device in a tank monitoring system according to this disclosure.

A digitization device 210 measures a distance between the main unit 202 and the probe 204 by reading the markings or other types of coding on the connector structure 206. The digitization device 210 could use any suitable technique to read the markings or other types of coding on the connector structure 206. For example, if textual markings are used on the connector structure 206, the digitization device 210 could perform pattern matching. If magnetic codes are used on the connector structure 206, the digitization device 210 could perform magnetic sensing. The digitization device 210 includes any suitable structure for reading the markings or other types of coding on a connector structure. Details of an example embodiment of the digitization device 210 are shown in FIG. 3, which is described below.

A user interface 212 facilitates communication between the tank monitoring system 116 and an operator or other personnel. The user interface 212 could, for example, display a current level reading obtained by the digitization device 210. The user interface 212 includes any suitable interface for interacting with one or more users, such as a liquid crystal display or other display.

A wireless interface 214 facilitates the communication of data to or from the main unit 202. For example, the wireless interface 214 could receive level readings from the digitization device 210 and transmit the readings (along with related data like timestamps or confidence intervals) to one or more external destinations. The external destinations could include the user device 118, controller 120, historian 122, or any other location(s) where the wireless signals can reach. Also, the wireless communications could be uni-directional or bi-directional. Uni-directional communications allow the tank monitoring system 116 to provide level readings and related data to the external destinations. Bi-directional communications also allow the tank monitoring system 116 to receive data, such as commands, from one or more external sources. The wireless interface 214 includes any suitable structure supporting wireless communications, such as a radio frequency (RF) or other wireless transceiver and antenna.

Although FIG. 2 illustrates one example of a tank monitoring system 116, various changes may be made to FIG. 2. For example, the probe 204 could be raised and lowered in any other suitable manner. Also, the functional division shown in FIG. 2 is for illustration only. Various components could be combined, subdivided, or omitted and additional components could be added according to particular needs. In addition, functions described as being performed by one component of the tank monitoring system 116 could be performed by any other suitable component(s) of the tank monitoring system 116.

Figure 4:
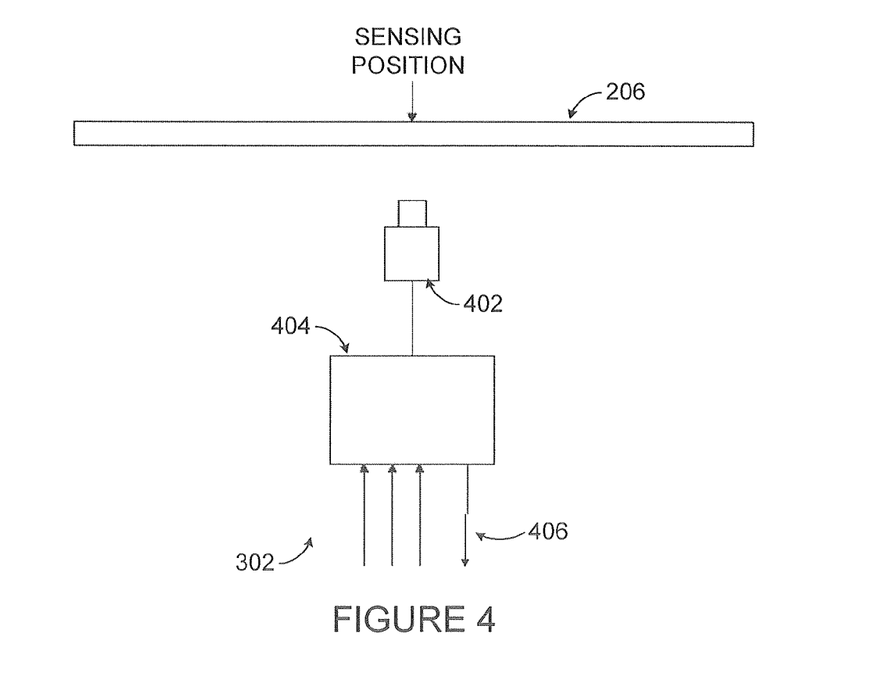
FIG. 4 illustrates an example sensor in a tank monitoring system according to this disclosure.

FIG. 3 illustrates an example digitization device 210 in a tank monitoring system 116 according to this disclosure. As shown in FIG. 3, the digitization device 210 includes a sensor 302, which captures information associated with at least one type of coding on the connector structure 206. For example, when textual markings are used, the sensor 302 could capture images of the connector structure 206. The images could then be processed (as described below) to determine the level of material in a tank 102. When magnetic codes are used, the sensor 302 could capture the magnetic codes from the connector structure 206. The sensor 302 includes any suitable structure for capturing information associated with at least one type of coding on a connector structure. Details of an example embodiment of the sensor 302 are shown in FIG. 4, which is described below.

An illumination source 304 can be used to illuminate the connector structure 206. This may be done, for example, to improve the quality of the images of the connector structure 206 captured by the sensor 302. As a particular example, the illumination source 304 could illuminate the connector structure 206 using infrared, visible, or other light to improve the contrast of images captured by the sensor 302. The illumination source 304 includes any suitable structure for illuminating a connector structure.

A logic circuit 306 and a programmable logic device (PLD) 308 control the operation of the sensor 302 and the illumination source 304. For example, the logic circuit 306 and the programmable logic device 308 can turn the illumination source 304 on and off and trigger the capture of information by the sensor 302, thereby synchronizing the operation of these components. The logic circuit 306 and the programmable logic device 308 can also perform other operations, such as power management functions and calibration operations. Depending on the implementation, each of these functions could involve one or both of the logic circuit 306 and the programmable logic device 308. The logic circuit 306 includes any suitable circuitry and the programmable logic device 308 includes any suitable programmable logic device (such as a complex PLD) for performing desired functions.

A processor 310 processes the information captured by the sensor 302 to determine a level reading of the material in the tank 102. For example, the processor 310 could perform pattern matching to identify textual markings contained in captured images of the connector structure 206. In some embodiments, the processor 310 uses a training database of images in order to identify the textual markings in an image. The training images can help the processor 310 more accurately perform the pattern matching. The processor 310 could perform other analyses depending on, for example, the type of coding used with the connector structure 206. For instance, when magnetic codes are used, the processor 310 could identify the distance values corresponding to the magnetic codes.

The processor 310 can perform various other operations to identify a level reading, such as neighbor tracking. In neighbor tracking, the processor 310 can use information adjacent to the information being processed to determine a current level reading. For instance, when attempting to determine the textual marking at a specified position of an image, the processor 310 can use neighboring textual markings in the image. As a particular example, if an image shows that the textual markings on one side of a partially-obscured marking increase are "115," "116," and "117," the partially-obscured marking would likely be "118" (instead of "113" or "123"). More complex neighbor tracking algorithms can also be used, which may be necessary, for example, if multiple textual markings are corrupted by contamination on the connector structure 206 (which obscures the coding on the connector structure 206).

In addition, the processor 310 performs calculations to determine a confidence level or interval associated with a determined level reading. For example, the connector structure 206 could be damaged during use, or material 114 from the tank 102 could remain on and contaminate the connector structure 206. These or other problems can prevent a level reading from being obtained with absolute accuracy, and the confidence level or interval identifies the certainty of the level reading obtained by the processor 310. As an example, the processor 310 can determine a confidence level or interval when performing pattern matching based on the quality of the match. As another example, neighbor tracking as discussed above can help to increase the confidence level or interval (since additional information is being used to increase the level of certainty about a current level reading).

The processor 310 includes any suitable processing or computing device. For example, the processor 310 could represent a micro-processor, micro-controller, field programmable gate array, application specific integrated circuit, or digital signal processor.

The processor 310 is coupled to an input/output (I/O) port 312, which facilitates communication between the processor 310 and external components (such as the user interface 212 and wireless interface 214) of the digitization device 210. The I/O port 312 represents any suitable interface, such as a serial interface.

A memory 314 is coupled to the programmable logic device 308. The memory 314 stores instructions and data used, generated, or collected by the digitization device 210. For example, the memory 314 could store images or other captured information associated with the coding on the connector structure 206, as well as calculated level readings and confidence levels or intervals. The memory 314 includes any suitable volatile and/or non-volatile storage and retrieval device(s).

Although FIG. 3 illustrates an example digitization device 210 in a tank monitoring system 116, various changes may be made to FIG. 3. For example, the functional division shown in FIG. 3 is for illustration only. Various components could be combined, subdivided, or omitted and additional components could be added according to particular needs. Also, functions described as being performed by one component of the digitization device 210 could be performed by any other suitable component(s) of the digitization device 210.

FIG. 4 illustrates an example sensor 302 in a tank monitoring system 116 according to this disclosure. As shown in FIG. 4, the sensor 302 captures information about at least one type of coding at a specified sensing position of the connector structure 206. In this example, the sensor 302 includes a camera 402, which captures images of the connector structure 206 at least at the sensing position. The camera 402 could represent any suitable image capture device, such as a visible or infrared camera implemented using a CCD, CMOS, or other device. The camera 402 could also include suitable optics for capturing images of the connector structure 206.

Logic circuitry 404 is coupled to the camera 402 and to other components of the digitization device 210. The logic circuitry 404 performs various functions related to images captured by the camera 402. For example, in some embodiments, the logic circuitry 404 could simply serialize the image data or otherwise make the image data available to the processor 310 or other component. In other embodiments, the logic circuitry 404 can perform image processing operations, such as operations to enhance an image or to alter the resolution of the image. In still other embodiments, the logic circuitry 404 can perform more complex image processing operations, such as pattern recognition or optical character recognition, to identify level readings. In these embodiments, the logic circuitry 404 could perform some of the operations described above as being performed by the processor 310.

The logic circuitry 404 communicates with other components of the digitization device 210 via signal lines 406. The signal lines 406 could represent lines carrying clock signals, power, and commands to the logic circuitry 404 and image or level data from the logic circuitry 404. Other or additional signal lines could also be used. The signal lines 406 represent any suitable connections.

Although FIG. 4 illustrates an example sensor 302 in a tank monitoring system 116, various changes may be made to FIG. 4. For example, the sensor 302 could operate to capture information associated with other types of coding (such as magnetic codes) on the connector structure 206 and need not include a camera.

Figure 5:
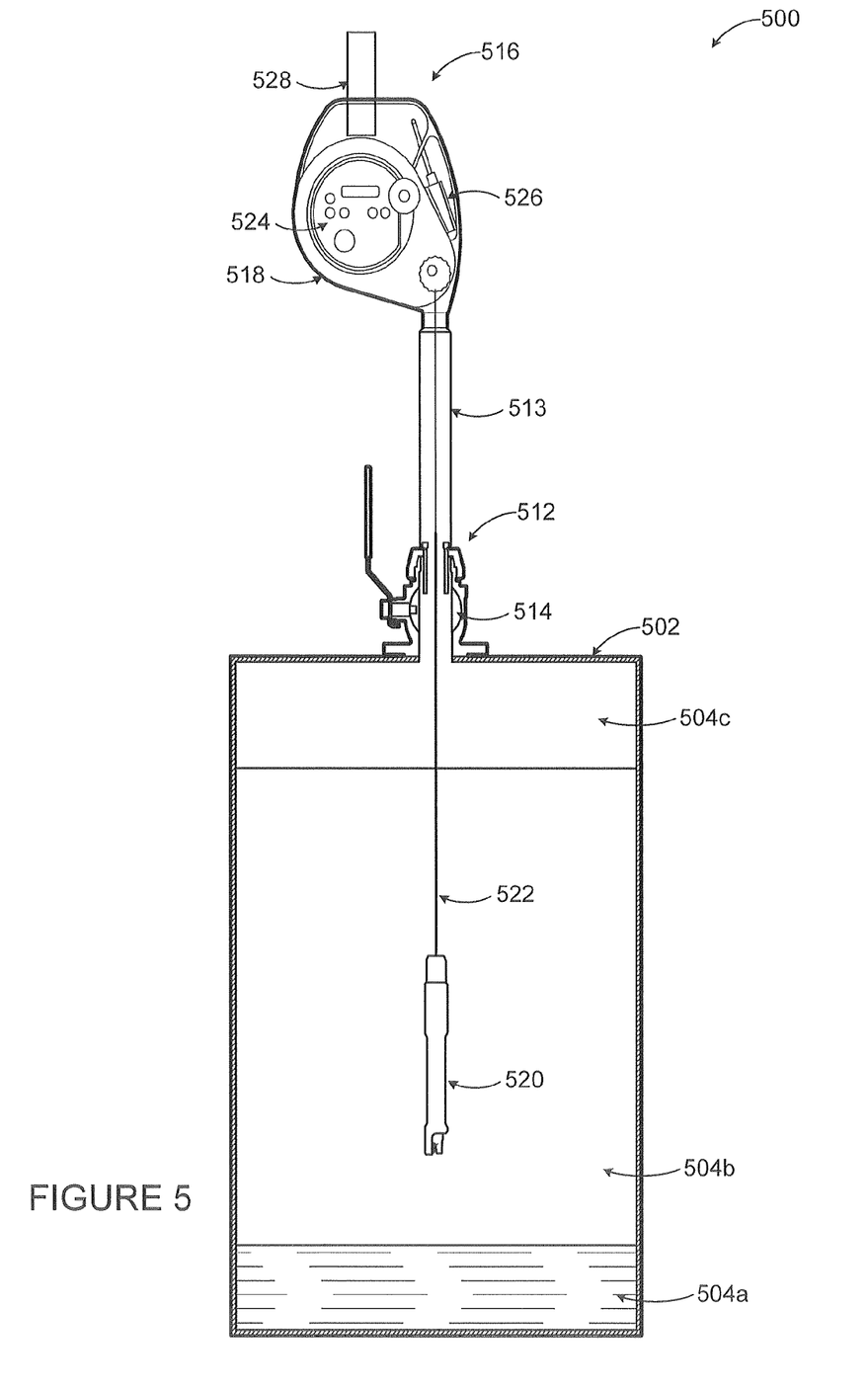
FIG. 5 illustrates another example inventory control and management system according to this disclosure.

FIG. 5 illustrates another example inventory control and management system 500 according to this disclosure. As shown in FIG. 5, the inventory control and management system 500 includes a tank 502 that contains various materials 504a-504c. As an example, the materials could include water (material 504a), oil or other liquid (material 504b), and vapor (material 504c). A mechanical coupling device 512 allows a tank monitoring system 516 to be mounted onto the tank 502. The mechanical coupling device 512 includes any suitable structure on which a tank monitoring system can be mounted. A supporting structure 513 is coupled to the mechanical coupling device 512 and to the tank monitoring system 516. The supporting structure 513 can be used, for example, to house a probe 520 when the probe is not in use. The supporting structure 513 could be fixed or removably attached to the mechanical coupling device 512. Access to the tank 502 can be obtained through a ball valve 514, which can be opened and closed to provide access to the materials in the tank 502.

In this example, the tank monitoring system 516 includes a main unit 518 coupled to the probe 520 by a connector structure 522. The main unit 518, probe 520, and connector structure 522 could be the same as or similar to the corresponding components shown in FIG. 2 and described above. The main unit 518 here includes an electronic unit 524 with a display that presents level readings to an operator. The electronic unit 524 could include any suitable display and be powered by any suitable power source (such as a battery). The main unit 518 also includes a manual reading window 526, which represents a clear or otherwise non-opaque window allowing an operator to manually view the connector structure 522. This may be useful, for instance, if the power supply in the electronic unit 524 fails or the electronic unit 524 otherwise stops displaying level readings. In addition, the main unit 518 includes a device 528 that captures level readings from the connector structure 522 and wirelessly transmits the level readings. The device 528 may, for example, include the digitization device 210 and the wireless interface 214 of FIG. 2. The device 528 can use any suitable technique for capturing level readings, such as pattern matching or optical character recognition.

Although FIG. 5 illustrates another example inventory control and management system 500, various changes may be made to FIG. 5. For example, the sizes and shapes of the main unit 518 and the probe 520 are for illustration only. Also, any other suitable mechanism could be used to mount the tank monitoring system 516 on a tank.

In any of the tank monitoring systems described above, the tank monitoring systems could include any of the following features. The tank monitoring systems can digitally capture level measurements with high accuracy (such as millimeter-scale accuracy). The tank monitoring systems can wirelessly connect level gauges to computers, control server stations, remote displays, or other destinations for real-time measurement monitoring. The level measurements can be digitally captured reliably and robustly even if a connector structure is contaminated or damaged. The level measurements can be provided with confidence levels, and warning levels can be used to trigger audible or visual alarms. Real-time control of a process (such as tank loading) can be supported using the level readings, and the tank monitoring systems can be used in hazardous areas.

Figure 6:
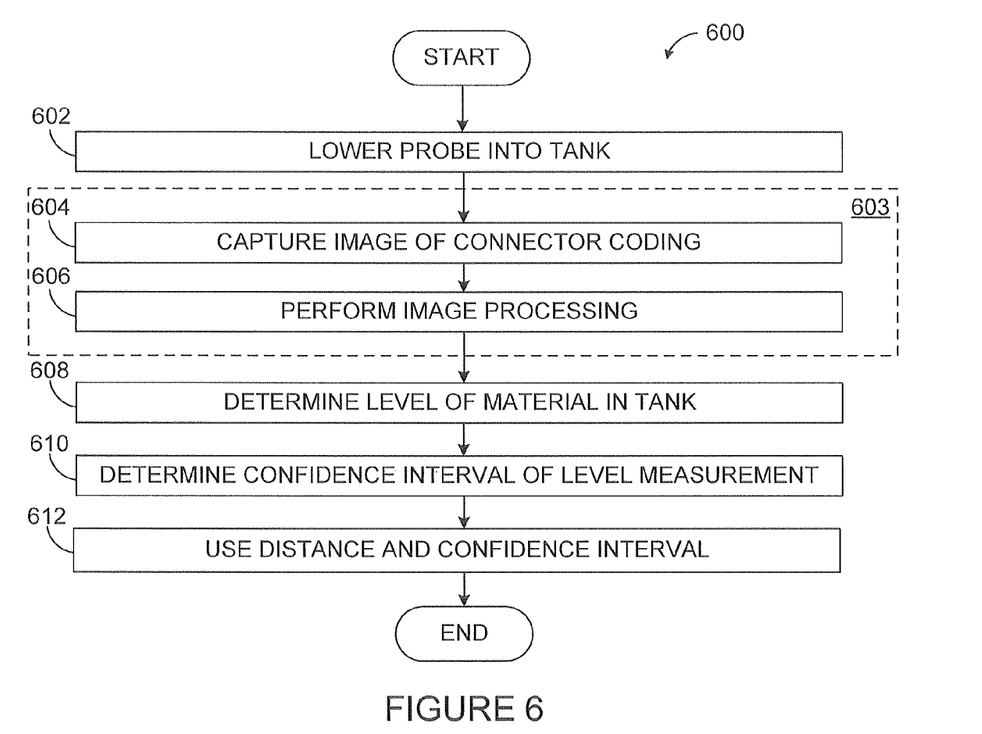
FIG. 6 illustrates an example method for automatic gauge reading in an inventory control and management system according to this disclosure.

FIG. 6 illustrates an example method 600 for automatic gauge reading in an inventory control and management system according to this disclosure. As shown in FIG. 6, a probe is lowered into a tank at step 602. This may include, for example, unwinding a connector structure coupled to the probe until the probe detects a specified material or materials in the tank. This may also include unwinding a connector structure coupled to the probe until the probe is in position to take ultrasonic or other measurements of the material(s) in the tank.

Information associated with at least one type of coding encoded on the connector structure is obtained at step 603. In this example, the information is obtained by capturing an image of at least one type of visible coding on the connector structure at step 604 and performing image processing at step 606. This could include, for example, using a camera to capture a visible or infrared image of textual markers or other types of coding on the connector structure. This could also include performing pattern recognition or optical character recognition on the images. Note, however, that information associated with at least one type of coding on the connector structure can be obtained in any other suitable manner. For instance, if a magnetic type of coding is used on the connector structure, information about magnetic codes can be obtained using suitable magnetic sensors.

A level of material in the tank is determined at step 608. This could include, for example, performing neighbor tracking or other techniques to identify the level reading in an image when a visible marking on the connector structure is obstructed in the image. Also, a confidence level or interval is determined at step 610. This could include, for example, determining the confidence level or interval based on a quality of the pattern match. The determined level reading and confidence level or interval are then stored, displayed, wirelessly communicated, or otherwise used at step 612. The determined level reading and confidence level or interval could be used in any suitable manner. For example, the determined level reading could be used to trigger an audible or visual alarm if the level exceeds a specified threshold level.

Although FIG. 6 illustrates an example method 600 for automatic gauge reading in an inventory control and management system, various changes may be made to FIG. 6. For example, while shown as a series of steps, various steps could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The term "program" refers to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

raising or lowering a probe in a tank that is configured to receive a material, the probe raised or lowered using a connector, the connector comprising at least one type of coding encoded on the connector;
digitally capturing information associated with the at least one type of coding on the connector;
determining a level reading identifying a level of the material in the tank using the captured information, wherein determining the level reading comprises compensating for contamination or damage associated with the connector; and
wirelessly transmitting the determined level reading.

2. The method of claim 1, wherein compensating for contamination or damage associated with the connector comprises performing a neighbor tracking process using the captured information.

3. The method of claim 2, wherein:
determining the level reading comprises using part of the captured information; and
compensating for the contamination or damage comprises using information adjacent to the part of the captured information.

4. The method of claim 2, wherein performing the neighbor tracking process comprises reading at least one readable marking near an unreadable marking to determine the unreadable marking.

5. The method of claim 4, wherein:
the markings are textual markings; and
reading the at least one readable marking comprises using a training database of images to identify the at least one readable marking.

6. The method of claim 1, wherein:
the connector comprises a tape; and
the at least one type of coding comprises one or more of: visible markings, perforations, and magnetic codes.

7. The method of claim 1, further comprising:
visually displaying the level reading in digital form to an operator.

8. The method of claim 1, further comprising:
controlling loading of the material into the tank using the determined level reading.

9. A method comprising:
raising or lowering a probe in a tank that is configured to receive a material, the probe raised or lowered using a connector, the connector comprising at least one type of coding encoded on the connector;
digitally capturing information associated with the at least one type of coding on the connector;
determining a level reading identifying a level of the material in the tank using the captured information;
determining a confidence level or confidence interval associated with the determined level reading; and
wirelessly transmitting the determined level reading and the confidence level or confidence interval.

10. A method comprising:
raising or lowering a probe in a tank that is configured to receive a material, the probe raised or lowered using a connector, the connector comprising at least one type of coding encoded on the connector;
digitally capturing information associated with the at least one type of coding on the connector;
determining a level reading identifying a level of the material in the tank using the captured information; and
wirelessly transmitting the determined level reading;
wherein:
digitally capturing the information comprises capturing an image of the connector; and
determining the level reading comprises performing pattern matching using the image.

11. A system comprising:
a probe configured to be raised and lowered in a tank that is configured to receive a material;
a connector coupled to the probe, the connector comprising at least one type of coding encoded on the connector; and
a main unit configured to:
raise and lower the probe using the connector;
digitally capture information associated with the at least one type of coding on the connector;
determine a level reading identifying a level of the material in the tank using the captured information; and
wirelessly transmit the determined level reading.

12. The system of claim 11, wherein the main unit is further configured to:
determine a confidence level or confidence interval associated with the determined level reading; and
wirelessly transmit the confidence level or confidence interval.

13. The system of claim 11, wherein:
the main unit is configured to digitally capture the information by capturing an image of the connector; and
the main unit is configured to determine the level reading by performing pattern matching using the image.

14. The system of claim 11, wherein the main unit is configured to determine the level reading by compensating for contamination or damage associated with the connector.

15. The system of claim 14, wherein:
the main unit is configured to determine the level reading using part of the captured information; and
the main unit is configured to compensate for the contamination or damage using information adjacent to the part of the captured information.

16. The system of claim 11, wherein:
the connector comprises a tape; and
the at least one type of coding comprises one or more of: visible markings, perforations, and magnetic codes.

17. The system of claim 11, further comprising:
a display configured to visually present the level reading in digital form to an operator.

18. The system of claim 11, wherein the main unit comprises:
a drum configured to raise and lower the probe, the connector wound around the drum;
a sensor configured to digitally capture the information;
a processor configured to determine the level reading; and
a wireless interface configured to wirelessly transmit the determined level reading.

19. An apparatus comprising:
a sensor configured to digitally capture information associated with at least one type of coding encoded on a connector, the connector configured to raise and lower a probe in a tank that is configured to receive a material;
a processor configured to determine a level reading identifying a level of the material in the tank using the captured information; and
a wireless interface configured to wirelessly transmit the determined level reading.

20. The apparatus of claim 19, wherein the processor is further configured to:
determine a confidence level or confidence interval associated with the determined level reading; and
wirelessly transmit the confidence level or confidence interval.

21. The apparatus of claim 19, wherein the processor is configured to determine the level reading using part of the captured information and to compensate for contamination or damage associated with the connector using information adjacent to the part of the captured information.

22. The apparatus of claim 19, wherein:
the connector comprises a tape; and
the at least one type of coding comprises one or more of: visible markings, perforations, and magnetic codes.

23. A system comprising:
a probe configured to be raised and lowered in a tank that is configured to receive a material;
a connector coupled to the probe, the connector comprising at least one type of coding encoded on the connector; and
a main unit configured to:
  raise and lower the probe using the connector;
  digitally capture information associated with the at least one type of coding on the connector;
  determine a level reading identifying a level of the material in the tank using the captured information, wherein the main unit is configured to compensate for contamination or damage to the connector by performing a neighbor tracking process using the captured information; and
  wirelessly transmit the determined level reading.

24. An apparatus comprising:
a sensor configured to digitally capture information associated with at least one type of coding encoded on a connector, the connector configured to raise and lower a probe in a tank that is configured to receive a material;
a processor configured to determine a level reading identifying a level of the material in the tank, wherein the processor is configured to compensate for contamination or damage to the connector by performing a neighbor tracking process using the captured information; and
a wireless interface configured to wirelessly transmit the determined level reading.

* * * * *